United States Patent [19]
Stalgren et al.

[11] Patent Number: 6,107,968
[45] Date of Patent: Aug. 22, 2000

[54] ANTENNA FOR HAND-HELD COMMUNICATION USER TERMINAL

[75] Inventors: Nils Allan Stefan Stalgren, Cary, N.C.; Bradley T. Philippi, Briston, Tenn.; Yawei Ma, Cary, N.C.; George Daniel, Chapel Hill, N.C.; Robert James Stanley, II, Cary, N.C.

[73] Assignee: Ericsson Inc., Research Triangle Park, N.C.

[21] Appl. No.: 09/128,755

[22] Filed: Aug. 4, 1998

[51] Int. Cl.$^7$ ....................................................... H01Q 1/24
[52] U.S. Cl. ............................................. 343/702; 343/906
[58] Field of Search ................................... 343/702, 882, 343/906, 904; H01Q 1/24

[56] References Cited

U.S. PATENT DOCUMENTS

| | | |
|---|---|---|
| 5,403,197 | 4/1995 | Ernst et al. . |
| 5,535,435 | 7/1996 | Balzano et al. . |
| 5,559,522 | 9/1996 | Seitz ........................................ 343/702 |
| 5,907,306 | 5/1999 | Karabinis et al. ....................... 343/702 |
| 6,002,377 | 12/1999 | Huynh et al. ........................... 343/895 |

FOREIGN PATENT DOCUMENTS

| | | |
|---|---|---|
| 0 694 985 A1 | 7/1995 | European Pat. Off. . |
| 0 835 033 A2 | 4/1998 | European Pat. Off. . |
| 197 08 120 C 1 | 6/1998 | Germany . |
| WO 92/05602 | 4/1992 | WIPO . |
| WO 96/33521 | 10/1996 | WIPO . |
| WO 97/13290 | 4/1997 | WIPO . |
| WO 98/28814 | 7/1998 | WIPO . |
| WO 98/58421 | 12/1998 | WIPO . |

*Primary Examiner*—Don Wong
*Assistant Examiner*—Shih-Chao Chen
*Attorney, Agent, or Firm*—Wood, Phillips, VanSanten, Clark & Mortimer

[57] ABSTRACT

A communication terminal including a communication unit, a longitudinal antenna enclosed in a radome, and a pivot connecting the antenna to the unit for pivoting about an axis with an RF connection to the unit. The unit is in a box-shaped enclosure having a front face with a keypad and connected to a rear face by top and bottom faces, and two side faces. One of the unit front and rear faces is non-planar from top to bottom with the spacing between the front and rear faces varying from top to bottom. The spacing between the radome front and rear faces varies to substantially match the varied spacing between the unit front and rear faces so that the radome and unit front and rear faces define a uniform profile when the radome is adjacent one unit side face. The unit top face lies on one side of a first plane and at least one unit side face lies on one side of a second plane perpendicular to the first plane. An L-shaped support secured to the unit supports a pivot shaft defining the pivot axis substantially parallel to both of the planes and spaced on the other side of both of the planes by distances allowing the antenna to pivot through a 270 degrees range. A plurality of detents are spaced about the pivot shaft, and a detent mechanism secured to the antenna engages one of the pivot shaft detents in each of a plurality of pivoted positions. The radome has two shells connected substantially along a plane, with longitudinally spaced ribs supporting the antenna in a position spaced from the shell outer walls.

17 Claims, 7 Drawing Sheets

ANTENNA FOR HAND-HELD COMMUNICATION USER TERMINAL

BACKGROUND OF THE INVENTION

1. Technical Field

The present invention is directed toward a hand-held user communication terminal, and more particularly toward an improved antenna for a satellite telephone.

2. Background Art

Antennas are, of course, an important component of any wireless communication device. For example, the quality of the signal received by telephones, whether cordless or cellular, is largely dependent on the quality of the antenna used with the telephone.

With the ever growing use of satellite telephones, which communicate not via a ground based unit a few feet or a few miles away but via a satellite many miles overhead in Earth orbit, the importance of the antenna, and the quality demands made of the antenna, have increased significantly.

Given the space-based infrastructure required for satellite systems, and the requirement that the system communicate with individual user units through the air over significantly greater distances than cellular systems, the cost of satellite systems may be expected to be greater than the cost of conventional land-wire, or even cellular, systems. However, while there are some obvious advantages of satellite telephones (e.g., mobile communication at even remote locations), the acceptability of satellite telephones will be greatly inhibited, particularly in view of cost, if the communication signals (e.g., sound qualities) are poor. The simple fact is that few potential users would be willing to pay significantly more for satellite telephones if the quality of the transmitted sound is poor. Of course, poor communication signals could also limit acceptability of the system among potential customers who wish to communicate data between computers, as poor quality of the communication signal could result in unacceptable unreliability of the transmitted data. Moreover, any such limited acceptability would be self-defeating, as it would limit the users, which in turn would keep costs high (by keeping down the number of users among which fixed costs could be spread) which would also limit acceptability.

Portability is, of course, also a key element in gaining widespread acceptability for satellite systems. Few users are willing to use such systems if their "mobile" unit must be carried in a suitcase. Self-contained hand-held mobile units are therefore a key element in gaining widespread use of the satellite systems. Such small units can come at a price, however, including the previously discussed undesirable degradation in communication signal due to the necessity that the antennas used with small units themselves be small, notwithstanding the need to handle communication signals which must be transmitted over great distances.

In short, it is extremely important, that the antennas used with satellite telephones not only be conveniently usable, but that they provide optimum functioning for the communication device.

One attempt at developing an antenna for hand-held satellite telephones is shown in U.S. Pat. No. 5,559,522. That structure provides an antenna which has an angled pivot in an attempt to orient the antenna vertically when in use. While that antenna structure may work adequately when the telephone is held in a small range of positions common in typical hand-held individual use, it is not adapted to provide ideal operation in all uses.

The present invention is directed toward overcoming one or more of the problems set forth above.

SUMMARY OF THE INVENTION

In one aspect of the present invention, a hand-held user communication terminal is provided including a communication unit and a longitudinal antenna. The communication unit includes an enclosure having a unit top lying generally on one side of a first plane and at least one unit side lying generally on one side of a second plane, where the first and second planes are at substantially right angles to one another. The antenna is mounted to the communication unit for pivoting about an axis between a first position with one antenna side adjacent the one unit side and a second position with the opposite antenna side adjacent the unit top. The one antenna side is spaced a first distance from a longitudinally oriented plane including the axis and the opposite antenna side being spaced a second distance from the longitudinally oriented plane, wherein the axis is spaced by at least the first distance from the first plane on the other side of the first plane and is spaced by at least the second distance from the second plane on the other side of the second plane.

In a preferred form of this aspect of the invention, the pivot is substantially transversely centered relative to the antenna with the first and second distances being substantially equal.

In another preferred form of this aspect of the invention, the antenna may be pivoted through a range of 270 degrees.

In another aspect of the present invention, a hand-held user communication terminal is provided including a communication unit, an antenna, and a pivot securing the antenna for pivoting about an axis fixed relative to the communication unit. The communication unit is in an enclosure having a unit top lying generally on one side of a first plane and at least one unit side lying generally on one side of a second plane, the first and second planes being at substantially right angles to one another. The antenna has a length and a selected transverse width along the length. The pivot axis is substantially parallel to both of the planes and spaced on the other side of both of the planes by distances which are at least half of the antenna transverse width.

In a preferred form of this aspect of the invention, the pivot includes an L-shaped support, with one leg of the support lying substantially entirely on the other side of the second plane with a portion of the one leg on the other side of the first plane, and the other leg of the support lying substantially entirely on the one side of the first plane with a portion of the other leg secured to the communication unit enclosure. The pivot shaft extends axially from the one leg portion, and a pivot opening in the antenna receives the pivot shaft.

In further preferred form of this aspect of the invention, a plurality of detents are spaced about the pivot shaft, and a detent mechanism secured to the antenna engages one of the pivot shaft detents in each of a plurality of pivoted positions of the antenna.

In a still further preferred form of this aspect of the invention, the antenna may be pivoted through a range of 270 degrees, and there are five detents with the detent mechanism engaging one of the detents at each end of the pivot range and the detent mechanism engaging one of the other three detents at each of three selected intermediate pivot positions.

In another preferred form of this aspect of the invention, the antenna includes a radome having two shells connected substantially along a plane extending in the longitudinal direction, the longitudinal plane being substantially perpendicular to the first and second planes, with an RF structure secured between the two shells.

In a further preferred form of this aspect of the invention, the radome two shells have outer walls with longitudinally spaced ribs therein supporting the RF structure in a position spaced from the shell outer walls.

In yet another aspect of the present invention, a hand-held user communication terminal is provided, including a communication unit, a longitudinal antenna enclosed in a longitudinal radome, and a pivot connecting the antenna and radome to the communication unit for pivoting about an axis. The communication unit is in a generally box-shaped enclosure which has a front face with a keypad and a rear face connected to the front face by a top face, bottom face, and two side faces. At least one of the unit front and rear faces is generally non-planar from the bottom face to the top face with the spacing between the front and rear faces varying from the bottom face to the top face. The antenna and radome pivot between a first position adjacent the one unit side face and a plurality of operative positions spaced from the one unit side face. The spacing between the radome front and rear faces along the length of the radome varies to substantially match the varied spacing between the unit front and rear faces.

In a preferred form of this aspect of the present invention, the radome is generally round with a flat side in cross-sections transverse to the longitudinal direction, the flat side being the radome front face. In a further preferred form, the radome rear face is disposed along a tangential plane substantially parallel to the orientation of the flat side in the transverse cross-sections.

In other preferred forms of this aspect of the invention, the radome and unit front and rear faces define a substantially uniform profile when the antenna and radome are in the first position, and one of the radome side faces are adjacent the one unit side face when the antenna and radome are in the first position, with the one radome side face having a longitudinal profile substantially matching the profile of the one unit side face between the bottom face and the top face.

It is an object of the invention to provide a hand-held communication unit which may be easily used.

It is another object of the invention to provide a hand-held communication unit which will provide high quality communication signals.

It is still another object of the invention to provide a hand-held communication unit which is aesthetically pleasing.

It is yet another object of the invention to provide a hand-held communication unit which may be reliably operated in a wide variety of positions.

DESCRIPTION OF THE PREFERRED EMBODIMENT

Figure 1:
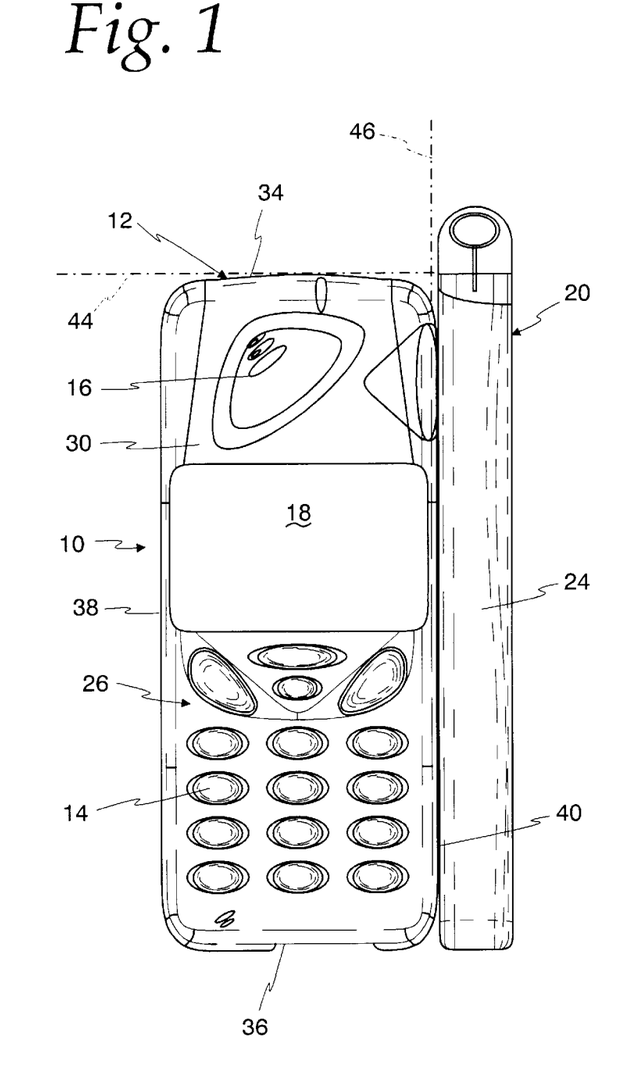
FIG. 1 is a front view of a hand-held user communication terminal embodying the present invention.

A hand-held user communication terminal 10, such as a satellite telephone, according to the present invention is shown in FIG. 1. The terminal 10 includes a communication unit 12 with a keypad 14, speaker 16 and data display 18. The terminal 10 also includes an antenna 20 pivotally connected to the communication unit 12 as described in greater detail further below. The antenna 20 includes a radome 24 enclosing the antenna components as also described in greater detail further below.

The communication unit 12 includes an enclosure 26 which houses a controller, processor and other components (not shown) for receiving, processing and transmitting signals such as is known in the art for satellite communication systems. The enclosure 26 includes a front face 30 and a rear face 32 (shown in phantom in FIG. 2) connected by a top face 34, bottom face 36 and two side faces 38, 40. The top face 34 lies substantially entirely on one side of a first plane 44, and one side face 40 lies substantially entirely on one side of a second plane 46 which is substantially perpendicular to the first plane 44. That is, as viewed in the FIG. 1 orientation, the top face 34 is beneath the first plane 44 and the right side face 40 is to the left of the second plane 46.

Figure 2:
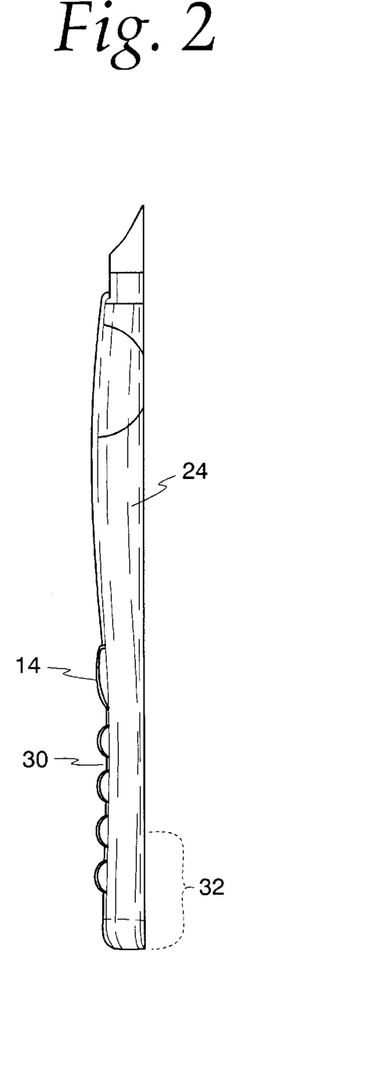
FIG. 2 is a side view from the right in FIG. 1 showing the front half of the communication terminal.

In the preferred embodiment as illustrated in FIG. 2, the front face 30 of the enclosure 26 is not planar but instead is curved so that, particularly with a generally flat rear face 32, the spacing between the front and rear faces 30, 32 varies along the height of the enclosure 26.

Figure 3:
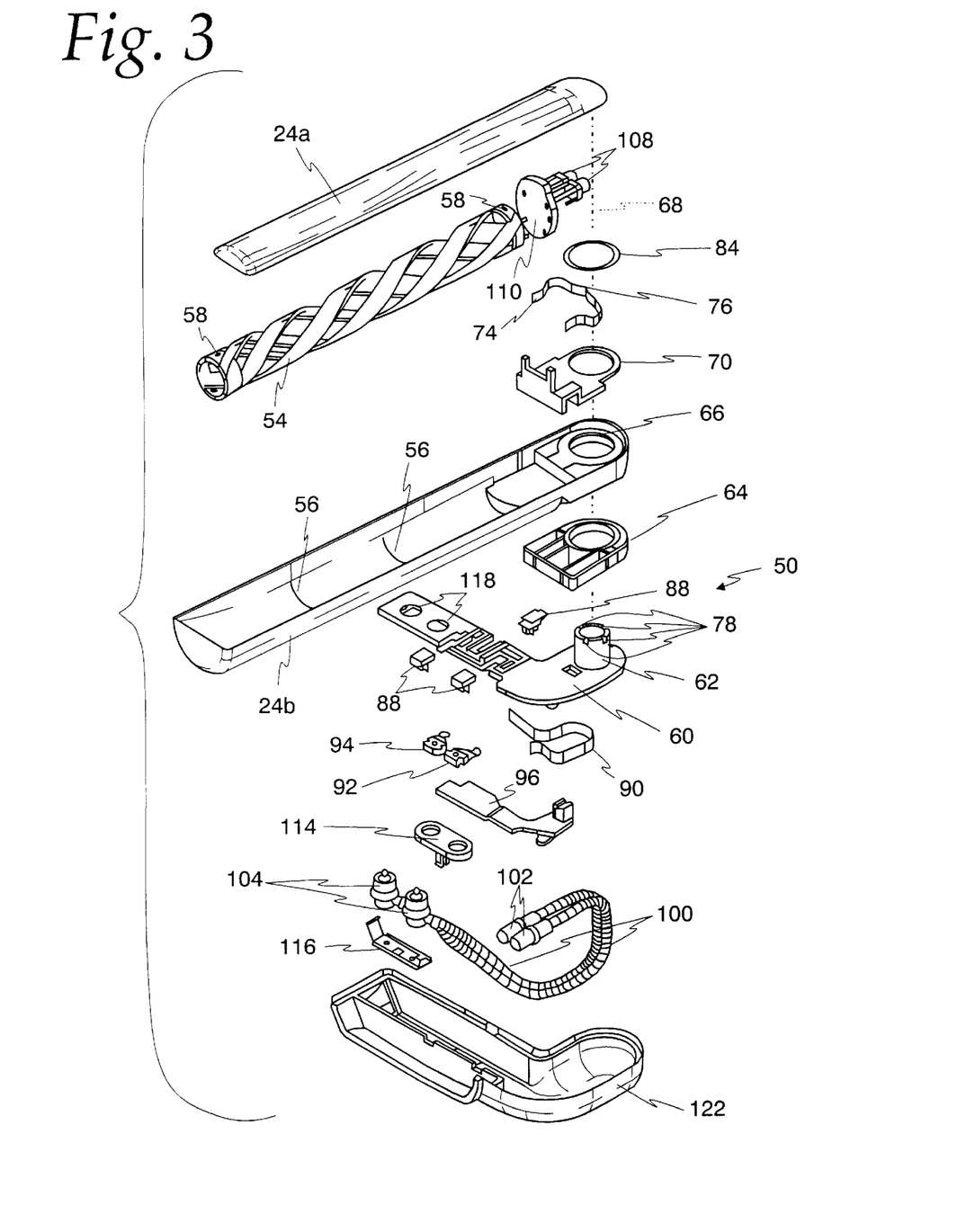
FIGS. 3–4 are exploded views of the antenna assembly of the present invention.
Figure 4:
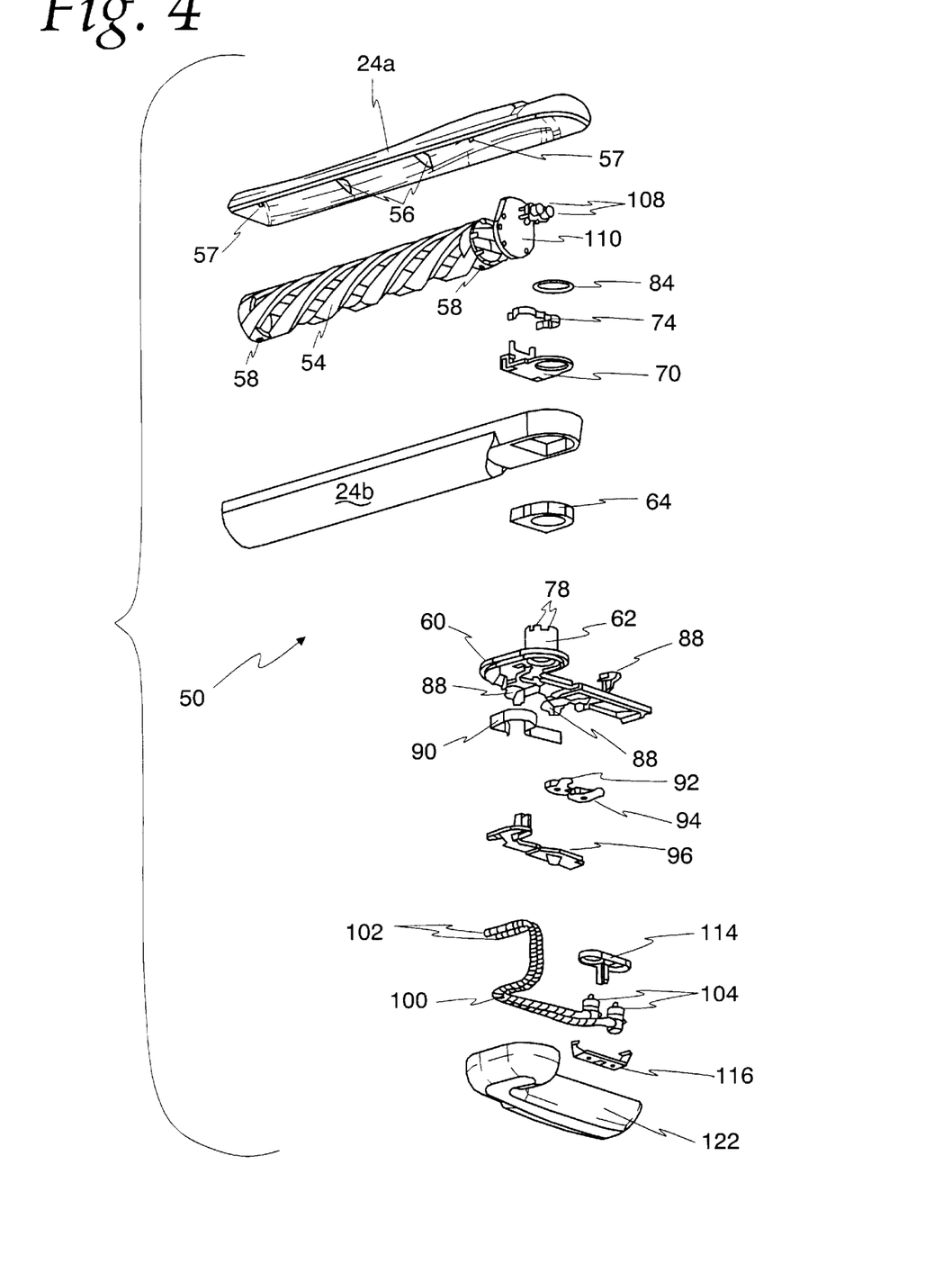
Figure 5:
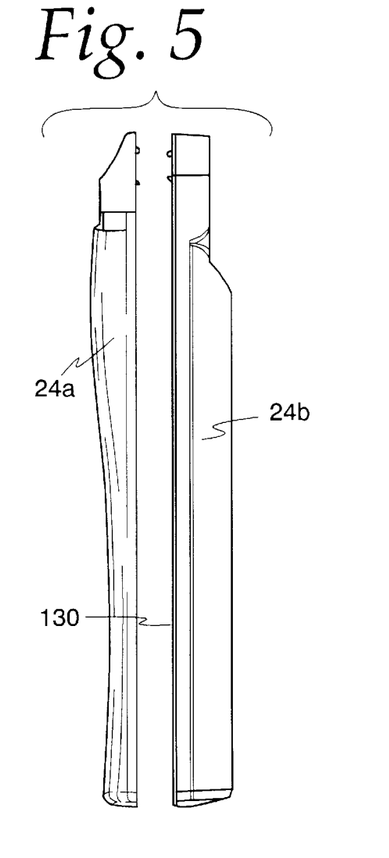
FIG. 5 is a side view of the radome shells of a the preferred embodiment of the present invention.
Figure 6:
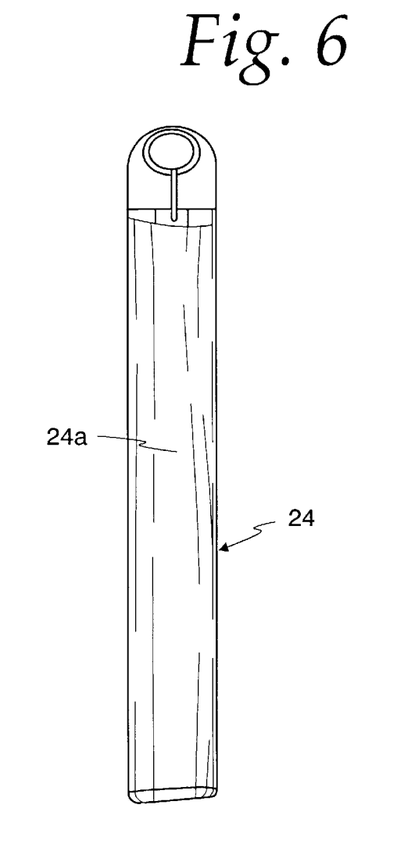
FIG. 6 is a front view of the radome.
Figure 7:
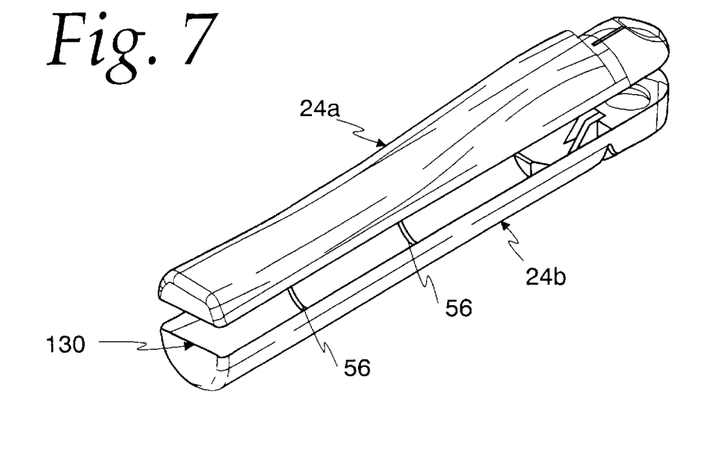
FIG. 7 is a perspective view of the radome shells.

An antenna assembly 50 according to the preferred embodiment of the present invention is shown in exploded views in FIGS. 3 and 4. The antenna 20 includes a suitable RF structure or antenna element 54 which is secured between two shells 24a, 24b, which are also illustrated in FIGS. 5–7. Each radome shell 24a, 24b includes at least two longitudinally spaced ribs 56 which support the RF antenna element 54 within the radome 24 so that an air space between the RF antenna element 54 and the outer walls of the radome 24 is provided along substantially the entire length of the RF antenna element 54 so as to provide ideal operation. In a preferred form, pins 57 (see FIG. 4) are also provided in at least one of the shells 24a, 24b and are received in matching holes 58 (see FIGS. 3 and 4) in the RF antenna element 54 to further secure the RF antenna element 54 within the radome 24.

An L-shaped mounting plate 60 includes a hollow pivot shaft 62 thereon which extends through a pivot bushing 64 and a cylindrical opening 66 in radome shell 24b to permit relative pivoting about pivot axis 68. The pivot bushing 64 is received in a recess in radome shell 24b so as to pivot with the radome 24.

A support bracket 70 is mounted inside radome shell 24b at the pivot end and, in the embodiment shown in FIGS. 3–4, mounts a detent mechanism with one detent member such as the detent spring 74 shown having a convex point 76 biased outwardly and receivable in a plurality of other detent members, such as the illustrated detent recesses 78 in the pivot shaft 62 when the antenna 20 is at selected pivotal positions. As illustrated, the pivot shaft 62, includes four detent recesses 78, two of which are spaced apart about 270 degrees for receiving the detent sprint convex point 76 when at the end of the pivot range of the antenna 20 (i.e., parallel to the top and parallel to the side of the terminal 10) to hold the antenna 20 in such positions, and two of which are at intermediate positions for securing the antenna 20 at intermediate pivoted positions as also discussed hereafter.

It should be recognized that still other detent mechanisms could be used with the present invention including, for example, a ball bearing which is biased toward suitably spaced detent recesses.

A retainer ring 84 is disposed over the end of the pivot shaft 62 and is frictionally secured thereon by a suitable interference fit to secure the antenna 20 to the mounting plate 60 for pivoting. Of course, still other means for retaining the antenna 20 on the mounting plate 60 could be used within the scope of the invention, including, for example, a retaining ring received in a groove about the pivot shaft 62.

The mounting plate 60 includes three latches 88 which are slidably mounted thereon, and a leaf spring 90 engages a pair of levers 92, 94 pivotally mounted to the mounting plate. The levers 92, 94 engage the latches 88 to bias them outwardly for securing the mounting plate 60 to the back of the communication unit 12 as described in greater detail hereafter. A backing plate 96 is securable to the mounting plate 60 for retaining the leaf spring 90 and levers 92, 94 on the mounting plate 60.

Suitable RF coaxial cables 100 have terminals 102, 104 on opposite ends and provide high quality signal transmission and reliably long lasting flexible connection between the terminal 10 and RF antenna element 54. The cables 100 extend through the center of the hollow pivot shaft 62 so that terminals 102 extend into the radome 24 and are connected to terminals 108 of a suitable connector assembly 110 connected to the RF antenna element 54. The terminals 104 at the opposite end of the cables 100 are suitably secured between a mounting bracket 114 and backing plate 116 so that the terminals 104 are maintained at an appropriate spacing with their ends projecting from openings 118 in the mounting plate 60.

An L-shaped back housing 122 is suitably secured over the mounting plate 60 and various attached components for protection, strength and, of course, for aesthetic reasons.

The radome 24 is also illustrated in FIGS. 5–7 as mentioned above. The two shells 24a, 24b of the radome 24 are separated along a plane which is substantially oriented in the longitudinal direction of the antenna 20. In the preferred form illustrated, one shell 24b includes a lip 130 (see FIG. 7) which is received inside the other shell 24a. A suitable adhesive is used to secure the two shells 24a, 24b together during assembly with the RF antenna element 54 and other components (support bracket 70, detent spring 74, retainer ring 84 and connector assembly 110) therein. As previously mentioned, the ribs 56 in both shells 24a, 24b support the RF antenna element 54 from the outer walls of the shells 24a, 24b so as to maintain a uniform air space around the antenna element 54 for ideal operation of the antenna 20. This design allows for easy assembly with access to the RF antenna element 54 being permitted until the end of assembly when the two shells 24a, 24b are adhered together, and further ensures that the components are guided to their precisely proper position in the radome 24 during such assembly. It should also be understood that other aspects of the invention disclosed herein could be achieved with a radome formed of more than two shells and/or with shells joined along more than one plane, or joined along a curvature.

As also illustrated in FIGS. 5–7 and as previously mentioned, this structure allows the overall outer shape or profile of the antenna 20 to be varied so as to substantially match the top to bottom curvature of the communication unit 12. The front face presented by shell 24a includes a transversely flat surface (i.e., the radome 24 in cross-sections perpendicular to the longitudinal direction of the antenna 20 is rounded with a flat side) which essentially tracks the front face 30 of the communication unit 12 (see also FIG. 2) when the antenna 20 is in its stored position with one of its sides adjacent the side face 40 of the communication unit 12 as shown in FIG. 1. This configuration not only is aesthetically pleasing, but also substantially eliminates any projecting surfaces in the antenna 20 or communication unit 12 which might be inadvertently bumped to cause the antenna 20 to be inadvertently and undesirably pivoted from its stored position adjacent the side face 40 of the communication unit 12. If the communication terminal 10 is being carried in the user's briefcase, for example, a projecting surface might catch on something as it shifts around in the briefcase and pivot the antenna away from the unit 12. In such a position, the antenna 20 would be much more susceptible to being damaged as the communication terminal 10 further shifts around in the briefcase. By eliminating such surfaces, this possibility is essentially eliminated by this preferred embodiment of the present invention. It should be understood, however, that other aspects of the invention disclosed herein could be obtained without a radome profile matching the profile of the communication unit such as detailed above.

Figure 8:
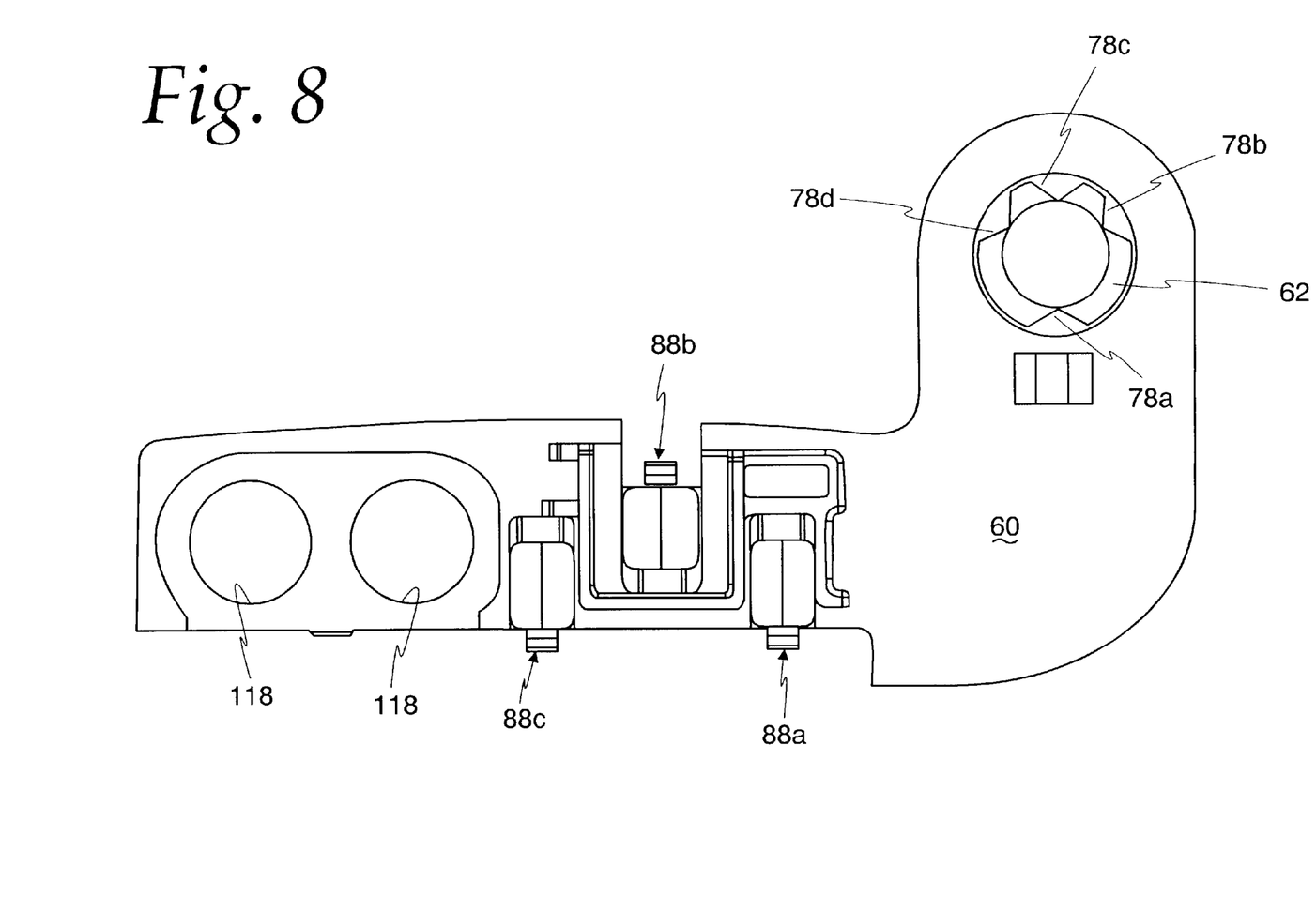
FIG. 8 is a front view of the mounting plate of the antenna assembly illustrating the latch structure for securing the antenna assembly to the communication unit.
Figure 9:
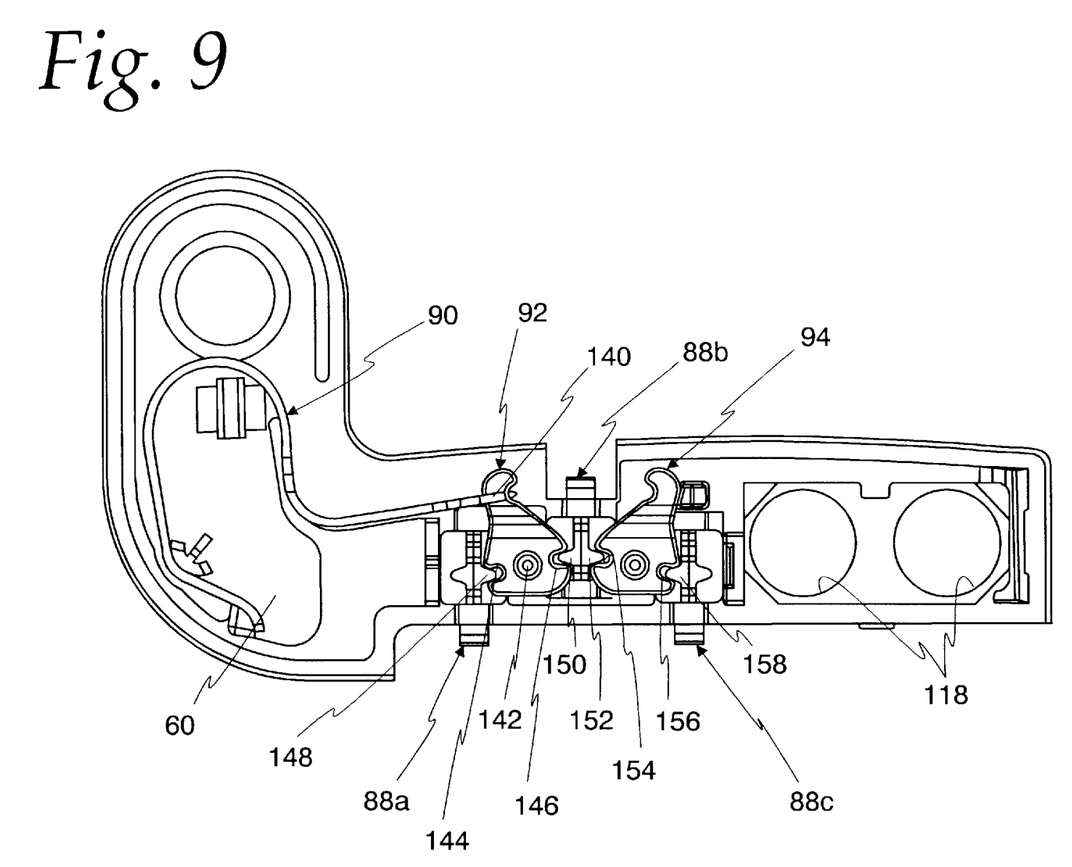
FIG. 9 is a rear view of FIG. 8.

FIGS. 8–9 further illustrate the preferred structure for attaching the antenna assembly 50 to the communication unit 12. The leaf spring 90 is secured to the mounting plate 60 with one end 140 suitably attached to one of the levers 92 to pivotally bias the lever 92 in a counterclockwise direction (as viewed in FIG. 9) about pivot pin 142 on the mounting plate 60. The lever 92 has two notches 144, 146 receiving ears 148, 150 on the latches 88a, 88b such that the biased lever 92 biases both of the latches 88a, 88b outwardly. A second ear 152 on latch 88b is received in a notch 154 in the other lever 94 so that the outward bias on the latch 88b biases the other lever 94 clockwise as viewed in FIG. 9, whereby the lever 94 through the engagement of a second notch 156 engages the ear 158 on latch 88c to cause it to also be biased out as well. The communication unit 12 includes recesses therein for receiving the ends of the latches 88a–c to hold the antenna assembly 50 thereon. The ends of the latches 88a–c are preferably tapered so that the assembly 50 can be pushed onto the unit 12 with the latches 88a–c being forced in against the above described biasing forces until they reach the unit recesses, at which point they will snap out into the recesses and detachably hold the antenna assembly 50 on the communication unit 12. It should be understood, however, that still other structures for attaching the antenna assembly 50 to the communication unit 12 could be used with the present invention.

Figure 10:
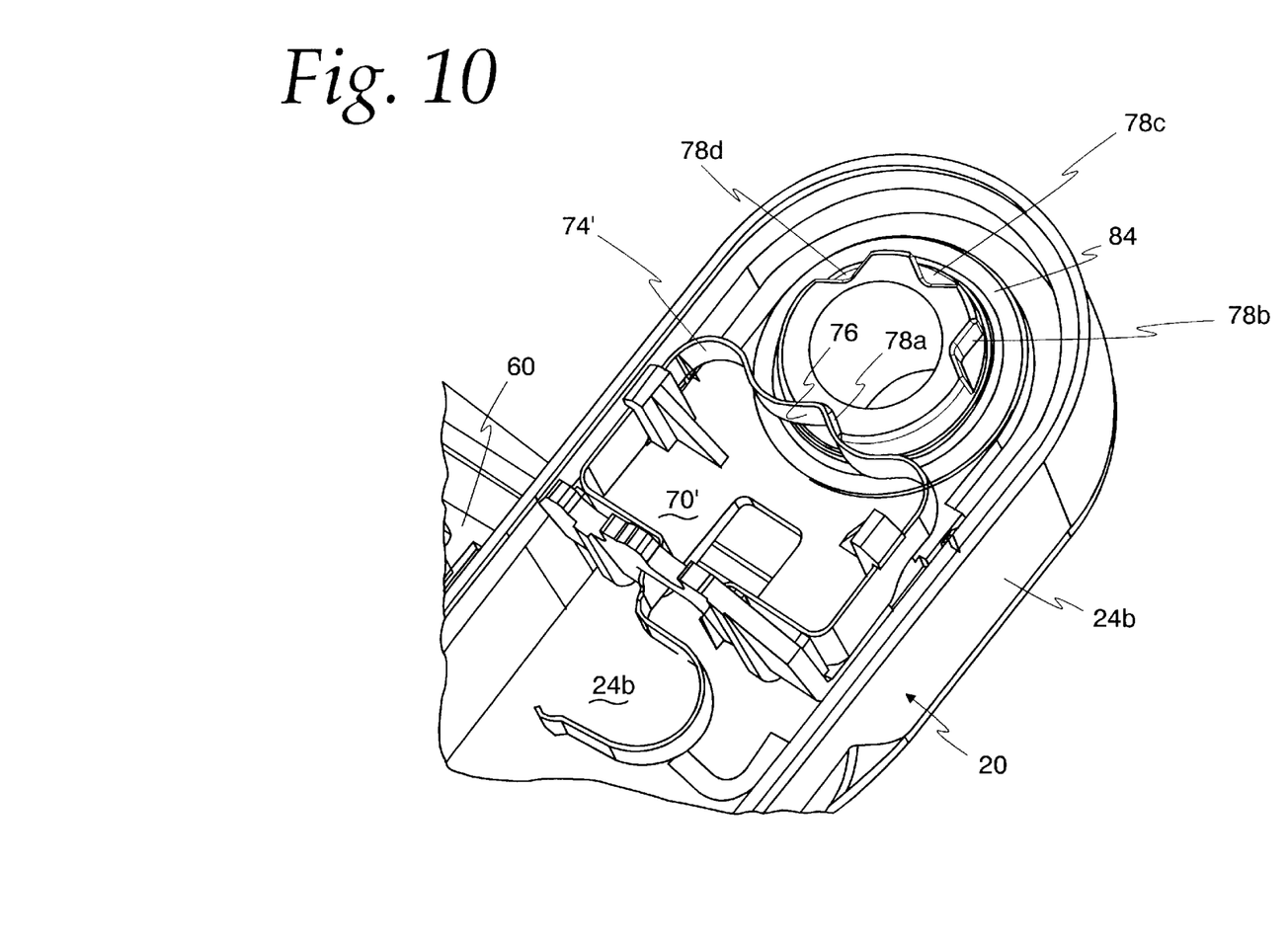
FIG. 10 is a partially broken perspective view illustrating a pivot structure for the antenna of the present invention.

FIG. 10 illustrates a suitable pivot connection for the antenna having slightly different details than shown in FIGS. 3–4, but working according to substantially the same concept as that shown in FIGS. 3–4. (Some parts, such as antenna element 54 and cables 100 are omitted from FIG. 10 permit clear illustration of the pivot connection.) Specifically, a detent mechanism is provided such as spring 74' which is suitably secured to support bracket 70' so that its convex point 76 is biased outwardly, that is radially toward the pivot axis 68. (As previously mentioned, still other detent mechanisms such as a spring loaded ball bearing could alternatively be used). In the storage position shown, the convex point 76 is received in detent recess 78a to secure the antenna 20 in that position against the side of the communication unit 12. The antenna 20 may for operation be manually pivoted from the storage position (in a counterclockwise direction in FIG. 10) to a plurality of operational positions. Additional detent recesses 78b–d are spaced about the pivot shaft 62 for receiving the convex point 76 of the detent spring 74' in further positions, for example at positions at about 145 degrees with recess 78b, 180 degrees with recess 78c and 270 degrees with recess 78d. These detent positions assist a user in finding preselected positions without having to use their vision as the only means of reference (and using their vision during a call would undesirably require them to move the phone away from their ear and possibly miss important information).

Of course, still other detent recesses could be provided to provide positive placement at other pivot positions of the antenna 20 where desired. Further, it should be recognized that the antenna 20 could be placed in an essentially infinite number of positions through the 270 degree range of motion to provide ideal operation, as the antenna 20 is not required to be at the preselected detent positions for operation.

It should thus now be apparent that the communication terminal 10 according to the present invention can provide ideal operation, as the antenna 20 thereof may be easily placed at an infinite number of positions through a full 270 degree range. Such a position span allows the antenna 20 to maintain the gain pattern necessary for optimum utilization of the satellite system with a wide variety of different possible orientations of the communication unit 12. Further, this allows for the communication unit 12 to be placed in a stationary position such as a car cradle while still maintaining the gain patter in the vertical position, thereby eliminating the need for an external antenna system.

Still other aspects, objects, and advantages of the present invention can be obtained from a study of the specification, the drawings, and the appended claims.

What is claimed is:

1. A hand-held user communication terminal, comprising:
    a communication unit in an enclosure having a unit top lying generally on one side of a first plane and at least one unit side lying generally on one side of a second plane, said first and second planes being at substantially right angles to one another;
    a longitudinal antenna mounted to said communication unit for pivoting about an axis between a first position with one antenna side adjacent said one unit side and a second position with the opposite antenna side adjacent said unit top, said one antenna side being spaced a first distance from a longitudinally oriented plane including said axis and said opposite antenna side being spaced a second distance from said longitudinally oriented plane, wherein said axis is spaced by at least said first distance from said first plane on the other side of said first plane and is spaced by at least said second distance from said second plane on the other side of said second plane.

2. The hand-held user communication terminal of claim 1, wherein said pivot axis is substantially transversely centered relative to said antenna with said first and second distances being substantially equal.

3. The hand-held user communication terminal of claim 1, wherein said antenna is adapted to pivot through a range of 270 degrees.

4. A hand-held user communication terminal, comprising:
    a communication unit in an enclosure having a unit top lying generally on one side of a first plane and at least one unit side lying generally on one side of a second plane, said first and second planes being at substantially right angles to one another;
    an antenna having a length and a selected transverse width along said length; and
    a pivot securing said antenna for pivoting about an axis fixed relative to said communication unit, said axis substantially parallel to both of said planes and spaced on the other side of both of said planes by distances which are at least half of said antenna transverse width.

5. The hand-held communication terminal of claim 4, wherein said pivot comprises:
    an L-shaped support, one leg of said support lying substantially entirely on the other side of the second plane with a portion of said one leg on the other side of the first plane, and the other leg of said support lying substantially entirely on the one side of the first plane with a portion of said other leg secured to the communication unit enclosure;
    a pivot shaft extending axially from said one leg portion; and
    a pivot opening in said antenna receiving said pivot shaft.

6. The hand-held communication terminal of claim 5, further comprising a detent mechanism including:
    a plurality of first detent members spaced about one of said pivot shaft and antenna pivot opening; and
    a second detent member secured to the other of said pivot shaft and antenna pivot opening, said second detent member engaging one of said first detent members in each of a plurality of pivoted positions of said antenna.

7. The hand-held communication terminal of claim 6, wherein said antenna is adapted to pivot through a range of 270 degrees, and there are four first detent members with said second detent member engaging one of said first detent members at one end of said pivot range and said second detent member engaging one of the other three first detent members at each of three selected intermediate pivot positions.

8. The hand-held communication terminal of claim 4, wherein said antenna comprises:
    a radome having two shells connected substantially along a plane extending in the longitudinal direction, said longitudinal plane being substantially perpendicular to said first and second planes; and
    an RF structure secured between said two shells.

9. The hand-held communication terminal of claim 8, wherein said radome's two shells have outer walls with longitudinally spaced ribs therein supporting said RF structure in a position spaced from said shell outer walls.

10. A hand-held user communication terminal, comprising:
    a communication unit in a generally box-shaped enclosure, said enclosure having a front face with a keypad and a rear face connected to said front face by a top face, bottom face, and two side faces, at least one of said front and rear faces being generally non-planar from the bottom face to the top face with the spacing between the front and rear faces varying from said bottom face to said top face;
    a longitudinal antenna;
    a longitudinal radome enclosing said antenna, said radome having a front face and a rear face with two side faces;
    a pivot connecting said antenna and radome to the communication unit for pivoting about an axis adjacent the unit top face and one of the unit side faces, said antenna and radome pivoting between a first position adjacent said one unit side face and a plurality of operative positions spaced from said one unit side face;

wherein the spacing between the radome front and rear faces along the length of the radome varies to substantially match said varied spacing between the unit front and rear faces.

11. The hand-held user communication terminal of claim 10, wherein the radome is generally round with a flat side in cross-sections transverse to the longitudinal direction, said flat side being said radome front face.

12. The hand-held user communication terminal of claim 11, wherein said radome rear face is disposed along a tangential plane substantially parallel to the orientation of said flat side in said transverse cross-sections.

13. The hand-held user communication terminal of claim 10, wherein said radome and unit front and rear faces define a substantially uniform profile when said antenna and radome are in said first position.

14. The hand-held user communication terminal of claim 10, wherein one of said radome side faces are adjacent said one unit side face when said antenna and radome are in said first position, with said one radome side face having a longitudinal profile substantially matching the profile of said one unit side face between the bottom face and the top face.

15. A hand-held user communication terminal, comprising:

a communication unit in an enclosure having a unit top and a unit side;

an antenna; and a pivot shaft adjacent said unit top and unit side and securing said antenna for pivoting about an axis fixed relative to said communication unit;

a plurality of first detent members spaced about one of said pivot shaft and antenna pivot opening; and a second detent member secured to the other of said pivot shaft and antenna pivot opening, said second detent member engaging one of said first detent members in each of a plurality of pivoted positions of said antenna.

16. The hand-held communication terminal of claim 15, wherein:

said pivot shaft is adjacent said unit top and unit side;

said antenna is adapted to pivot through a range of 270 degrees; and there are four first detent members with said second detent member engaging one of said first detent members at each end of said pivot range and said second detent member engaging one of the other two first detent members at each of two selected intermediate pivot positions.

17. A hand-held user communication terminal, comprising:

a communication unit;

a longitudinally extending antenna including
a radome having two shells connected substantially along a plane extending in the longitudinal direction,
an RF structure secured between said two shells, said radome's two shells have outer walls with longitudinally spaced ribs therein supporting said RF structure in a position spaced from said shell outer walls; and a pivot shaft adapted to secure said antenna for pivoting about an axis fixed relative to said communication unit.

* * * * *